(12) United States Patent
Kong et al.

(10) Patent No.: US 10,933,394 B2
(45) Date of Patent: Mar. 2, 2021

(54) APPARATUS FOR IMPROVING THERMAL EFFICIENCY OF STEAM PRODUCTION

(71) Applicant: L'Air Liquide, Societe Anonyme pour l'Etude et l'Exploitation des Procedes Georges Claude, Paris (FR)

(72) Inventors: Paul Kong, Sugar Land, TX (US); Alexander Roesch, Katy, TX (US)

(73) Assignee: L'Air Liquide Societe Anonyme Pour L'Etude Et L 'Exploitation Des Procedes Georges Claude, Paris (FR)

( * ) Notice: Subject to any disclaimer, the term of this patent is extended or adjusted under 35 U.S.C. 154(b) by 161 days.

(21) Appl. No.: 16/185,694

(22) Filed: Nov. 9, 2018

(65) Prior Publication Data
US 2020/0147570 A1    May 14, 2020

(51) Int. Cl.
*B01J 7/02*    (2006.01)
*B01J 19/00*   (2006.01)
(Continued)

(52) U.S. Cl.
CPC ............ *B01J 7/02* (2013.01); *B01J 19/0013* (2013.01); *B01J 19/245* (2013.01); *C01B 3/388* (2013.01); *C01B 3/48* (2013.01); *C01B 3/56* (2013.01); *B01J 2219/00087* (2013.01); *B01J 2219/00157* (2013.01); *C01B 2203/0233* (2013.01); *C01B 2203/0283* (2013.01); *C01B 2203/042* (2013.01); *C01B 2203/0485* (2013.01); *C01B 2203/0833* (2013.01); *C01B 2203/0883* (2013.01); *C01B 2203/1241* (2013.01); *C01B 2203/142* (2013.01)

(58) Field of Classification Search
CPC combination set(s) only.
See application file for complete search history.

(56) References Cited

U.S. PATENT DOCUMENTS 4,065,483 A * 12/1977 Pinto ..................... C07C 29/154
518/704
4,370,162 A * 1/1983 Dominguez-Ahedo .....................
C21B 13/029
75/496

(Continued)

*Primary Examiner* — Kaity V Chandler
(74) *Attorney, Agent, or Firm* — Justin K. Murray

(57) ABSTRACT

An apparatus for improving thermal efficiency of steam production is provided. In one embodiment, the apparatus can include: a BFW heat exchanger in fluid communication with a hydrocarbon gas source and a boiler feed water source, wherein the BFW heat exchanger is configured to allow for the natural gas stream to exchange heat with the first BFW stream such that the hydrocarbon gas stream is pre-heated within the BFW heat exchanger and the BFW stream is cooled; a syngas production facility in fluid communication with the BFW heat exchanger, wherein the syngas production facility comprises a steam methane reformer (SMR) that is configured to convert natural gas within the hydrocarbon gas stream into a hot product stream comprising hydrogen and carbon monoxide, wherein the SMR comprises a plurality of burners; and a third heat exchanger in fluid communication with the first heat exchanger and the syngas production facility, wherein the third heat exchanger is configured to exchange heat between the hot product stream and the first BFW stream, thereby creating a hot BFW stream and a cooled product stream.

11 Claims, 2 Drawing Sheets

(51) Int. Cl.
    *B01J 19/24*       (2006.01)
    *C01B 3/38*        (2006.01)
    *C01B 3/48*        (2006.01)
    *C01B 3/56*        (2006.01)

(56) References Cited

U.S. PATENT DOCUMENTS

| | | | | |
|---|---|---|---|---|
| 7,037,485 | B1* | 5/2006 | Drnevich | C01B 3/56 |
| | | | | 423/652 |
| 7,427,368 | B2* | 9/2008 | Drnevich | C01B 3/386 |
| | | | | 252/373 |
| 8,496,908 | B1* | 7/2013 | Genkin | F23G 7/07 |
| | | | | 423/651 |
| 8,956,587 | B1* | 2/2015 | Peng | C01B 3/384 |
| | | | | 423/650 |
| 9,556,026 | B1* | 1/2017 | Davis | C01B 3/384 |
| 2004/0248999 | A1* | 12/2004 | Briscoe | C01B 3/384 |
| | | | | 518/703 |
| 2009/0230359 | A1* | 9/2009 | Guvelioglu | C01B 3/48 |
| | | | | 252/373 |
| 2009/0246118 | A1* | 10/2009 | Drnevich | C10K 1/004 |
| | | | | 423/650 |
| 2011/0146991 | A1* | 6/2011 | Palamara | C01B 3/384 |
| | | | | 166/303 |
| 2014/0034479 | A1* | 2/2014 | Peng | B01D 3/065 |
| | | | | 203/22 |
| 2014/0319427 | A1* | 10/2014 | Chakravarti | C01B 3/384 |
| | | | | 252/373 |
| 2016/0332876 | A1* | 11/2016 | Xu | B01D 53/047 |

* cited by examiner

APPARATUS FOR IMPROVING THERMAL EFFICIENCY OF STEAM PRODUCTION

TECHNICAL FIELD OF THE INVENTION

The present invention generally relates to an apparatus and method for improving the operation of a steam methane reformer, and more particularly, recovering process waste heat in syngas plants.

BACKGROUND OF THE INVENTION

Hydrogen gas is used in many applications including uses in the petrochemical industry, food industry, and treatment of metals. Hydrogen gas also has practical uses in fuel cell applications. It is a cleaner gas than many other industrial gases, and is usually produced by steam methane reforming or electrolysis.

Steam methane reforming is the most common process used to produce syngas and is also very economical. The syngas product contains hydrogen and carbon monoxide and other trace gases (e.g., unreacted methane, water vapor, nitrogen, carbon dioxide). Steam methane reforming utilizes various steps in the steam methane reforming process including but not limited to introduction of gas via pipeline, desulfurization, catalytic reactions in the tubes contained in a furnace before cooling occurs, which may then be followed by a secondary reaction for additional hydrogen production. After these steps, the hydrogen is sent to a purification device to remove carbon dioxide in order to reach the desired purity.

Steam methane reforming utilizes the following chemical reactions:

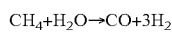

A secondary additional reaction is sometimes utilized after cooling:

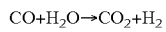

FIG. 1 represents a typical SMR process flow diagram. Natural gas 2, which is at approximately 30° C., and recycled hydrogen 4 are mixed and warmed in heat exchanger 10 to a temperature of approximately 360° C. to form hot feed stream 12. Hot feed stream 12 is then introduced to a desulfurization unit 20 for removal of sulfur from hot feed stream 12 to form clean hot feed stream 22, which has a significantly reduced amount of sulfur as compared to hot feed stream 12. Clean hot feed stream 22 is then mixed with process steam 24 and heated in SMR heat recovery section 30 before being introduced to pre-reformer 40 in order to convert the heavier hydrocarbons into methane and carbon oxides (CO, $CO_2$) at relatively low temperatures, typically from 400 to 550° C. The lower temperatures of the pre-reformer 40 are used in order to prevent coke deposition on the walls of the reformer 50 and catalyst surface.

A pre-reformer partially completes the steam reforming reactions upstream of the main steam reformer at a much lower temperature using a highly active catalyst. Aside from reducing coke formation, use of the pre-reformer advantageously allows for the conventional steam reformer furnace, which is the most expensive capital item on the plant, to be made smaller.

The pre-reformed stream 42 is then heated in SMR heat recovery section 30 again using the heat from the flue gas of the primary SMR reaction before introduction to the reformer tubes of the SMR furnace 50. After heating, it is sent to steam methane reformer 50 for reforming to create crude syngas stream 52. As the reforming reaction is endothermic, heat is added to the reaction via combustion of a fuel in the burners. The produced crude syngas stream 52 is then fed to a high temperature water gas shift reactor 60, wherein CO reacts with $H_2O$ to convert the CO to $CO_2$ and produce additional hydrogen. The resulting hot shifted stream 62 is then introduced to natural gas preheater 10 in order to provide the preheating of natural gas 2 from earlier, resulting in warm shifted stream 64, which in this embodiment, can have a temperature of approximately 322° C.

Meanwhile, boiler feed water 72 is withdrawn from boiler feed water preparation system 70, pressurized by pump 80 in order to increase boiler feed water pressure for the downstream steam generation system (not shown). Pressurized boiler feed water stream 82, which is at approximately 106° C. and 60 barg, is then heated in third heat exchanger 90 using the heat from warm shifted stream 64 in order to produce hot boiler feed water stream 92, which is at approximately 221° C. and colder shift gas stream 94. The hot boiler feed water stream 92 can be used to generate steam in a downstream steam generation system (not shown).

A problem that occurs during normal SMR operation is that the heat recovery by the boiler feed water from the cooled, shifted syngas (stream 64) can be limited due to process constraints (e.g., pinch points of the heat exchangers).

Therefore, it would be desirable to have an improved apparatus and method that avoids these pinch points and operates in an overall more efficient manner.

SUMMARY OF THE INVENTION

The present invention is directed to a method and apparatus that satisfies at least one of these needs. In one embodiment, the method can include adding an additional heat exchanger in order to exchange heat between the boiler feed water and the natural gas feed. This heat exchanger is configured to warm the natural gas feed stream prior to the heat exchanger that warms the natural gas against the shifted syngas stream. The heat for this heat exchanger is provided by the boiler feed water at a point upstream the heat exchanger that warms the boiler feed water against the shifted syngas stream. Embodiments of the invention advantageously provide an improved operating expenditure by improving internal heat recovery of the syngas by maximizing steam production. In certain embodiments, less natural gas can be consumed.

In one embodiment, the invention can include a method for improving thermal efficiency of steam production in a steam reforming based syngas plant. In one embodiment, the method can include the steps of: preheating a hydrocarbon feed stream in a first heat exchanger from a first temperature to a second temperature; preheating the hydrocarbon feed stream in a second heat exchanger to a third temperature, wherein the third temperature is greater than the second temperature; introducing the hydrocarbon feed stream in the presence of steam to a steam methane reformer under conditions effective for producing a product stream comprising hydrogen, carbon oxides, and water vapor; and exchanging heat between the product stream and a boiler feed water stream in a third heat exchanger, wherein prior to exchanging heat with the product stream, the boiler feed water stream is used to provide the preheating to the hydrocarbon feed stream in the first heat exchanger.

In optional embodiments of the method for improving thermal efficiency of steam production in a steam reforming based syngas plant:

the hydrocarbon feed stream is provided at ambient temperature and the second temperature is between 50° C. and 160° C., and preferably between 50° C. and 100° C.; and/or the product stream, prior to cooling in the third heat exchanger is at a temperature above the dew point of water and is cooled to a fourth temperature that is below the dew point of water such that at least a portion of water within the product stream is condensed.

In another aspect of the invention, a method for improving thermal efficiency of steam production in a steam reforming based syngas plant is provided. In one embodiment, the method can include the steps of: providing a natural gas stream at a first temperature; providing a first boiler feed water (BFW) stream at a first BFW temperature; pre-heating the natural gas stream in a BFW heat exchanger, against the first BFW stream, to a second temperature, thereby cooling the first BFW stream, wherein the second temperature is higher than the first temperature; introducing the natural gas stream into a production facility under conditions effective for converting natural gas within the natural gas stream into a hot product stream comprising hydrogen and carbon monoxide, wherein the natural gas stream is introduced to the production facility at a third temperature, wherein the third temperature is higher than the second temperature, wherein the production facility comprises a steam methane reformer (SMR); and cooling the hot product stream in a third heat exchanger against the first BFW stream thereby heating the first BFW stream to create a hot BFW stream.

In optional embodiments of the method for improving thermal efficiency of steam production in a steam reforming based syngas plant:

the natural gas stream is provided at ambient temperature and the second temperature is between 50° C. and 160° C.;

the hot product stream, prior to cooling in the third heat exchanger is at a temperature above the dew point of water and is cooled to a fourth temperature that is below the dew point of water such that at least a portion of water within the hot product stream is condensed; and/or can also include, prior to step (d), a step of splitting the natural gas stream into a fuel stream and a process stream, wherein the process stream is the natural gas stream sent to the production facility in step (d), and wherein the fuel stream is introduced to a plurality of burners within the SMR of the production facility.

In another aspect of the invention, a method for improving thermal efficiency of steam production in a steam reforming based syngas plant is provided. In one embodiment, the method can include the steps of: providing a hydrocarbon feed stream; preheating the hydrocarbon feed stream in a first heat exchanger against a boiler feed water (BFW) stream to produce a warm feed stream and a cool BFW water stream; preheating the warm feed stream in a second heat exchanger to produce a hot feed stream; introducing the hot feed stream or a stream derived therefrom into a steam methane reformer under conditions effective to create a syngas stream, the syngas stream having an increased amount of hydrogen and carbon monoxide as compared to the hot feed stream; cooling the syngas stream or a stream derived therefrom in the second heat exchanger against the warm feed stream to produce a warm syngas stream; warming the cool BFW water stream in a third heat exchanger against the warm syngas stream to produce a cooled syngas stream and a hot boiler feed water stream, the cooled syngas stream comprising hydrogen and carbon oxides.

In optional embodiments of the method for improving thermal efficiency of steam production in a steam reforming based syngas plant:

a hydrogen recycle stream that is derived from the cooled syngas stream is mixed with the warm feed stream upstream the second heat exchanger;

the feed stream further comprises light petroleum gases (LPG);

the LPG includes a hydrocarbon selected from the group consisting of C3 hydrocarbons, C4 hydrocarbons, and combinations thereof;

the LPG hydrocarbon is C3 and the warm feed stream is at a temperature of at least 85° C. and a pressure of at least 35 bar (g), wherein the boiler feed water stream at an inlet of the first heat exchanger is at a temperature of at least 106° C.;

the LPG hydrocarbon is C4 and the warm feed stream is at a temperature of at least 145° C. and a pressure of at least 35 bar (g), wherein the boiler feed water stream at an inlet of the first heat exchanger is at a temperature of at least 160° C. and a pressure of about 6 bar (g);

a first portion of the warm feed stream, after step b) and prior to step c), is sent to burners of the steam methane reformer to be used as fuel;

the warm feed stream is at a temperature of 50° C. and 100° C.; and/or the hot boiler feed water is at a temperature of 210° C. to 250° C. at an outlet of the third heat exchanger.

In another aspect of the invention, an apparatus for improving thermal efficiency of steam production is provided. In one embodiment, the apparatus can include: a BFW heat exchanger in fluid communication with a hydrocarbon gas source and a boiler feed water source, wherein the BFW heat exchanger is configured to allow for the natural gas stream to exchange heat with the first BFW stream such that the hydrocarbon gas stream is pre-heated within the BFW heat exchanger and the BFW stream is cooled; a syngas production facility in fluid communication with the BFW heat exchanger, wherein the syngas production facility comprises a steam methane reformer (SMR) that is configured to convert natural gas within the hydrocarbon gas stream into a hot product stream comprising hydrogen and carbon monoxide, wherein the SMR comprises a plurality of burners; and a third heat exchanger in fluid communication with the first heat exchanger and the syngas production facility, wherein the third heat exchanger is configured to exchange heat between the hot product stream and the first BFW stream, thereby creating a hot BFW stream and a cooled product stream.

In optional embodiments of the apparatus:

the syngas production facility further comprises a desulfurization unit, a pre-reforming unit, and a water-gas shift reactor;

the hydrocarbon gas source is a natural gas pipeline;

the boiler feed water source is a stripper, and more preferably a dearator;

the apparatus can also include a pressure swing adsorber (PSA) located downstream of the third heat exchanger, wherein the PSA is configured to receive the cooled product stream and produce a hydrogen product stream;

the apparatus can also include means for sending a portion of the hydrogen product stream to a point upstream the SMR;

the apparatus can also include means for splitting the natural gas stream into a fuel stream and a process stream; and/or the plurality of burners are in fluid communication with the means for splitting the natural gas stream into the fuel stream and a process stream, such that the plurality of burners are configured to receive the fuel stream.

BRIEF DESCRIPTION OF THE DRAWINGS

These and other features, aspects, and advantages of the present invention will become better understood with regard to the following description, claims, and accompanying drawings. It is to be noted, however, that the drawings illustrate only several embodiments of the invention and are therefore not to be considered limiting of the invention's scope as it can admit to other equally effective embodiments.

DETAILED DESCRIPTION

While the invention will be described in connection with several embodiments, it will be understood that it is not intended to limit the invention to those embodiments. On the contrary, it is intended to cover all the alternatives, modifications and equivalence as may be included within the spirit and scope of the invention defined by the appended claims.

Figure 2:
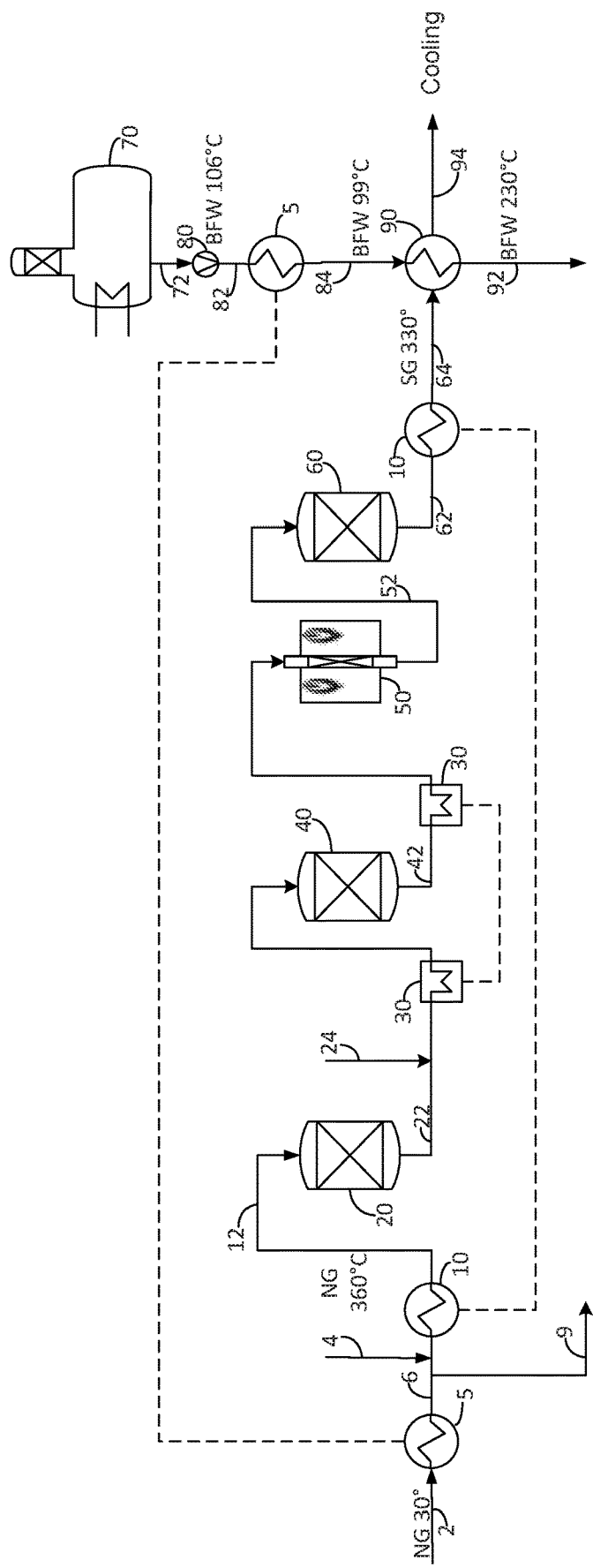
FIG. 2 shows an embodiment of the present invention.

FIG. 2 represents an SMR process flow diagram in accordance with an embodiment of the present invention. Hydrocarbon feed stream 2, which in this embodiment comprises natural gas and is typically at ambient conditions (e.g., approximately 30° C.), is preheated in BFW preheater 5 to produce warm hydrocarbon feed stream 6. In one embodiment, warm hydrocarbon feed stream 6 can be at about 80° C. In an optional embodiment, prior to mixture with hydrogen recycle 4, a slip stream 9 can be removed and used for fuel for the burners of the SMR 50. While the embodiment shown in FIG. 2 includes specific temperatures, those of ordinary skill in the art will recognize that the invention is not so limited. For example, the BFW stream 82 can be hotter than 106° C. (e.g., 160° C.), which will change the temperature profile of warm hydrocarbon feed stream 6. The increased temperature of the fuel used by the SMR allows for less fuel to be used as compared to typical SMR processes.

Recycled hydrogen 4 is mixed with warm feed stream 6 and then the combined stream is warmed in heat exchanger 10 to a temperature of approximately 360° C. to form hot feed stream 12. In another embodiment, recycled hydrogen 4 can be mixed with hydrocarbon feed stream 2 upstream of BFW preheater 5. Hot feed stream 12 is then optionally introduced to a desulfurization unit 20 for removal of sulfur from hot feed stream 12 to form clean hot feed stream 22, which has a significantly reduced amount of sulfur as compared to hot feed stream 12. Clean hot feed stream 22 is then mixed with process steam 24 and heated in SMR heat recovery section 30 before being optionally introduced to pre-reformer 40 in order to convert the heavier hydrocarbons into methane and carbon oxides (CO, $CO_2$).

The pre-reformed stream 42 is then heated in SMR heat recovery section 30 again using the heat from the flue gas of the primary SMR reaction before being introduced to the reformer tubes of the SMR furnace 50, wherein the pre-reformed stream 42 is reacted within tubes in the presence of a catalyst to create crude syngas stream 52. As the reforming reaction is endothermic, heat is added to the reaction via combustion of a fuel in the burners. The produced crude syngas stream 52 is then optionally fed to a high temperature water gas shift reactor 60, wherein CO reacts with $H_2O$ to convert the CO to $CO_2$ and produce additional hydrogen. The resulting hot shifted stream 62 is then introduced to natural gas preheater 10 in order to provide the preheating of warm feed stream 6 from earlier, resulting in warm shifted stream 64, which in this embodiment, can have a temperature of approximately 330° C.

Meanwhile, boiler feed water 72 is withdrawn from boiler feed water preparation system 70 and pressurized by pump 80, preferably to a pressure that is suitable for the downstream steam generation system (not shown). Pressurized boiler feed water stream 82, which is preferably at approximately 106° C. and 60 barg, is then cooled in BFW preheater 5 against the incoming hydrocarbon feed stream 2.

After being cooled in BFW heater 5, cooled BFW 84 is then heated in third heat exchanger 90 using the heat from warm shifted stream 64, which is preferably at approximately 330° C., in order to produce hot boiler feed water stream 92, which is at approximately 230° C. and cooled stream 94. The hot boiler feed water stream 92 can be used for steam generation (not shown). The temperature of cooled stream 94 is colder in the embodiment shown in FIG. 2 as compared to the embodiment shown in FIG. 1, which provide an additional advantage of reducing waste heat removal duty of cooling water.

By using heat from the boiler feed water, the hydrocarbon feed stream 2 can be preheated from ambient temperatures to about 80° C. One advantage of this preheating of the feed stream is that stream 6 enters the preheater 10 at a higher temperature (80° C. vs 30° C.), which then means that when stream 62 (syngas stream) exchanges heat with stream 6 in preheater 10, stream 64 is actually at a higher temperature than it otherwise would be (330° C. vs 322° C.). This higher temperature of stream 64 allows for more heat to be transferred to BFW 84 when exchanging heat in third heat exchanger 90, which in turn increases the temperature of stream 92 for embodiments of the present invention as compared to the prior art (e.g., 230° C. vs. 221° C.). With increased temperature of stream 92, more steam can subsequently be produced.

An additional advantage of certain embodiments is that by preheating a portion of the hydrocarbon feed stream that is used as fuel, less fuel is needed to achieve the same reaction within the SMR. Moreover, by preheating the hydrocarbon feed stream that is used as fuel, the potential for hydrate formation which may occur during the depressurization from process pressure to fuel pressure and associated operational issues are greatly reduced.

While this does result in the boiler feed water to be cooled (e.g., stream 84 is colder than stream 82), the final BFW stream (stream 92) is actually warmer than in the process of the prior art (See FIG. 1), which allows for increased steam production. This is partly due to the increased temperature of the fuel sent to the burners, which in turn can result in a higher temperature syngas (see stream 64). In the event increased steam is not desired, then less fuel can be used by the burners of the SMR. Additionally, by preheating the natural gas that is used as fuel, the potential for hydrate formation, which may occur during depressurization from process pressure to fuel pressure, and associated operational issues are greatly reduced.

In an optional embodiment not shown, additional heat available in the boiler feed water stream, 82 can be used to preheat any other fuel gas utilized in the SMR furnace section (e.g., PSA tail gas) to further improve the furnace efficiency, which leads to an overall reduced reformer fuel demand Embodiments of the present invention provide the benefit of increased steam production while also using less natural gas. For example, the configuration as described in FIG. 2 using natural gas as the feedstock provides a benefit over the configuration of FIG. 1 of approximately 1.9% more steam while using approximately 0.3% less natural gas. In an embodiment in which the feed stream uses $C_3$ or $C_4$ hydrocarbons, steam production can be increased by about 6.3% using the same amount of natural gas.

Figure 1:
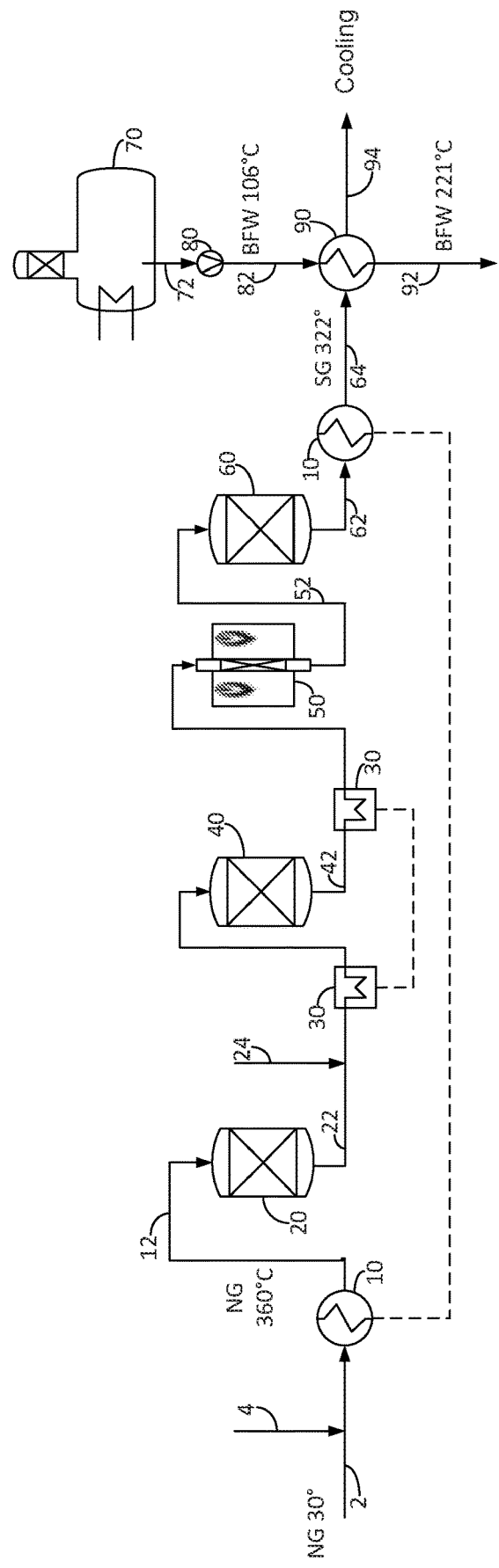
FIG. 1 shows an embodiment of the prior art.

As shown in FIGS. 1 and 2, stream 84 of FIG. 2 is at a cooler temperature as compared to stream 82 of FIG. 1. Furthermore, as explained earlier, stream 64 of the present invention is at a higher temperature as compared to the prior art. These two factors allow for an increased amount of heat to be exchanged and a higher temperature boiler feed water stream 92, which ultimately allows for increased steam production.

While the embodiments discussed herein are with respect to natural gas as the incoming feedstock, those of ordinary skill in the art will recognize that the feedstock should not be so limited. In fact, light LPG feedstock up to $C_3$ can work equally as well, and provide additional steam production as compared to natural gas. With light LPG feedstock up to $C_4$, increased steam production can also be achieved; however, BFW stream 82 would preferably be at a higher temperature (e.g., 160° C.) in order to achieve this result.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

We claim:

1. An apparatus for improving thermal efficiency of steam production, the apparatus comprising:
   (a) a boiler feed water (BFW) preheater in fluid communication with a hydrocarbon gas source and a boiler feed water source, wherein the BFW preheater is configured to allow for a hydrocarbon gas stream from the hydrocarbon gas source to exchange heat with a first BFW stream from the boiler feed water source such that the hydrocarbon gas stream is pre-heated within the BFW preheater and the first BFW stream is cooled;
   (b) a syngas production facility in fluid communication with the BFW preheater, wherein the syngas production facility comprises a steam methane reformer (SMR) that is configured to convert natural gas within the hydrocarbon gas stream into a hot product stream comprising hydrogen and carbon monoxide, wherein the SMR comprises a plurality of burners; and
   (c) a third heat exchanger in fluid communication with the BFW preheater and the syngas production facility, wherein the third heat exchanger is configured to exchange heat between the hot product stream and the first BFW stream, thereby creating a hot BFW stream and a cooled product stream.

2. The apparatus as claimed in claim 1, wherein the syngas production facility further comprises a desulfurization unit, a pre-reforming unit, and a water-gas shift reactor.

3. The apparatus as claimed in claim 1, wherein the hydrocarbon gas source is a natural gas pipeline.

4. The apparatus as claimed in claim 1, wherein the boiler feed water source comprises a deaerator.

5. The apparatus as claimed in claim 4, wherein the BFW preheater is in fluid communication with a liquid port of the deaerator such that the first BFW stream is in liquid phase.

6. The apparatus as claimed in claim 1, further comprising a pressure swing adsorber (PSA) located downstream of the third heat exchanger, wherein the PSA is configured to receive the cooled product stream and produce a hydrogen product stream.

7. The apparatus as claimed in claim 6, further comprising a conduit configured to send a portion of the hydrogen product stream to a point upstream the SMR.

8. The apparatus as claimed in claim 1, further comprising a slip stream conduit in fluid communication with the plurality of burners and an outlet of the BFW preheater, wherein the slip stream conduit is configured to split the hydrocarbon gas stream coming out of the outlet of the BFW preheater into a fuel stream and a process stream.

9. The apparatus as claimed in claim 1, wherein the plurality of burners are configured to receive a slip stream of the hydrocarbon gas stream for use as a fuel stream from a location that is downstream the BFW preheater.

10. The apparatus as claimed in claim 1, wherein the first BFW stream is in a liquid phase.

11. The apparatus as claimed in claim 1, wherein the third heat exchanger is in fluid communication with a steam generation unit such that heat from the hot BFW stream can be used to produce steam.

* * * * *